United States Patent
Hicks et al.

(10) Patent No.: US 9,600,053 B2
(45) Date of Patent: Mar. 21, 2017

(54) STYLUS CONTROL FEATURE FOR LOCKING/UNLOCKING TOUCH SENSITIVE DEVICES

(71) Applicant: BARNES AND NOBLE COLLEGE BOOKSELLERS, LLC, Basking Ridge, NJ (US)

(72) Inventors: Kourtny M. Hicks, Sunnyvale, CA (US); Dale J. Brewer, San Marcos, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 151 days.

(21) Appl. No.: 13/793,176

(22) Filed: Mar. 11, 2013

(65) Prior Publication Data
US 2014/0253461 A1    Sep. 11, 2014

(51) Int. Cl.
G06F 1/32        (2006.01)
G06F 3/0354      (2013.01)
G06F 21/31       (2013.01)

(52) U.S. Cl.
CPC ........ *G06F 1/3215* (2013.01); *G06F 3/03545* (2013.01); *G06F 21/31* (2013.01)

(58) Field of Classification Search
CPC .. G06F 3/03545; G06F 3/0488; G06F 1/3215; G06F 21/31
USPC ............... 345/173–184; 178/18.01–20.04
See application file for complete search history.

(56) References Cited

U.S. PATENT DOCUMENTS

| 4,896,543 | A | | 1/1990 | Gullman |
| 5,491,495 | A | * | 2/1996 | Ward ............... G06F 3/04883 345/163 |
| 5,633,471 | A | | 5/1997 | Fukushima |
| 5,844,557 | A | | 12/1998 | Shively, II |

(Continued)

FOREIGN PATENT DOCUMENTS

EP      0722150 A1    7/1996

OTHER PUBLICATIONS

"Adonit Jot Touch (for iPad)," Adonit Jot Touch (for iPad) Review & Rating—PCMag.com; http://www.pcnmag.com/article2/0,2817,2411192,00.asp; 6pages, printed from the Internet on Jun. 20, 2013.

(Continued)

*Primary Examiner* — Kumar Patel
*Assistant Examiner* — Vinh Lam
(74) *Attorney, Agent, or Firm* — Finch & Maloney PLLC

(57) ABSTRACT

Techniques are disclosed for locking and/or unlocking a touch sensitive device using one or more stylus control features. For example, the stylus control feature may be a twistable top button knob. In some instances, the twistable top button knob may be rotated and/or depressed to lock a related device. In some other instances, the twistable top button knob may be used to unlock a related device using a unique rotation sequence, thereby providing a security mechanism. For example, the unlocking sequence may require a user to rotate the twistable top button knob in a first direction to a first reference point, in a second direction to a second reference point, and back in the first direction to a third reference point. The stylus may also include a feedback indicator, such as a multi-colored light-emitting diode (LED), that indicates the lock status of a related device, for example.

20 Claims, 7 Drawing Sheets

(56) References Cited

U.S. PATENT DOCUMENTS

| | | | |
|---|---|---|---|
| 6,259,438 B1 | 7/2001 | Fleck et al. | |
| 6,512,513 B2* | 1/2003 | Fleck | G06F 3/03545 |
| | | | 178/19.01 |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E * | 3/2013 | Williams | G06F 3/03545 |
| | | | 178/18.01 |
| 8,400,417 B2 | 3/2013 | Ording et al. | |
| 8,508,494 B2 | 8/2013 | Moore | |
| 8,599,143 B1* | 12/2013 | Rymarz | G06F 3/03545 |
| | | | 345/156 |
| 2001/0025289 A1 | 9/2001 | Jenkins et al. | |
| 2002/0116421 A1 | 8/2002 | Fox et al. | |
| 2003/0222848 A1* | 12/2003 | Solomon | G06F 1/1601 |
| | | | 345/156 |
| 2007/0047002 A1 | 3/2007 | Hull et al. | |
| 2008/0036747 A1 | 2/2008 | Hope | |
| 2009/0184884 A1* | 7/2009 | Kyou | G06F 1/1626 |
| | | | 343/901 |
| 2010/0001951 A1* | 1/2010 | Yen | G06F 3/03545 |
| | | | 345/157 |
| 2010/0081479 A1* | 4/2010 | Lee | G06F 1/1626 |
| | | | 455/566 |
| 2010/0100854 A1 | 4/2010 | Russell et al. | |
| 2010/0182283 A1* | 7/2010 | Sip | G06F 1/1626 |
| | | | 345/179 |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2010/0333215 A1* | 12/2010 | Wang | G06F 1/1626 |
| | | | 726/34 |
| 2011/0258542 A1 | 10/2011 | Kenney et al. | |
| 2012/0056821 A1 | 3/2012 | Goh | |
| 2012/0086675 A1* | 4/2012 | Raif | G06F 3/03545 |
| | | | 345/179 |
| 2012/0127110 A1 | 5/2012 | Amm et al. | |
| 2012/0139879 A1 | 6/2012 | Kim et al. | |
| 2012/0216584 A1* | 8/2012 | Kemppainen | E05B 37/10 |
| | | | 70/305 |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0082937 A1* | 4/2013 | Liu | G06F 1/3262 |
| | | | 345/173 |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0135262 A1* | 5/2013 | Alameh | G06F 3/0383 |
| | | | 345/179 |
| 2013/0139078 A1 | 5/2013 | Chuang et al. | |
| 2013/0139107 A1 | 5/2013 | Jung | |
| 2013/0147626 A1* | 6/2013 | Hammoud | G08B 13/22 |
| | | | 340/569 |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |
| 2013/0207905 A1* | 8/2013 | Hankins | G06F 3/041 |
| | | | 345/173 |
| 2013/0307441 A1* | 11/2013 | Schuster | B06B 1/023 |
| | | | 318/127 |
| 2013/0307777 A1* | 11/2013 | Liu | G06F 3/0383 |
| | | | 345/163 |
| 2014/0033136 A1* | 1/2014 | St. Clair | G06F 3/017 |
| | | | 715/863 |
| 2014/0038558 A1* | 2/2014 | Kim | H04W 52/0254 |
| | | | 455/411 |
| 2014/0092069 A1* | 4/2014 | Bentov | G06F 1/26 |
| | | | 345/179 |
| 2014/0108979 A1* | 4/2014 | Davidson | G06F 3/0481 |
| | | | 715/765 |
| 2014/0168177 A1* | 6/2014 | Mkrtchyan | G06F 3/041 |
| | | | 345/179 |
| 2015/0339466 A1* | 11/2015 | Gao | G06F 21/36 |
| | | | 726/16 |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patently-apple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology–The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

(56) References Cited

OTHER PUBLICATIONS

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.
"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.
"How do WACOM tablets work?," tablet4u.co.uk, http://www.tablet4u.co.uk/techinfo.html, 2 pages, printed from the Internet on Jun. 20, 2013.
Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.
"Desktop Touchscreens,"—Desktop touchscreens explained, http://www.touchscreenmagazine.nl/touchscreen-solutions/desktop-touchscreens, 1 page, printed from the Internet on Nov. 3, 2012.
"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.
"Padblue 2," BRANDO—mobile.brando.com, http://mobile.brando.com/Padblue-2__p9162c1577d94.html., 4 pages, printed from the Internet on May 10, 2013.
Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.
"Bluetooth 4.0 SmartPen The future just got a little brighter," Pogo Connect, http://tenonedesign.com/connect.php, 7 pages, printed from the Internet on Jun. 20, 2013.
Quick, Darren, "Pressure sensitive technology set to bring 3D capability to touchscreens," posted on Jan. 31, 2010, Mobile Technology, http://www.gizmag.cominew-touchscreen-technology, 4 pages, printed from the Internet on Aug. 2, 2013.
Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," BRANDO—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, file:///S/Client%20Files/Barnes%20&%20Noble/IDS%20Master%20Folder/S&G%20-%2 . . . , 3 pages, printed from the Internet on Aug. 27, 2013.
Kanai, et al., "Intra-Rendition Navigation," Copyright 2012-2013 International Digital Publishing Forum (IDPF), 13 pages.
"Explaining how the sPen tech works (and is very diff than other styluses)," http://forum.xda-developers.com/showthread.php?t=, 1 page, printed from the Internet on Jan. 15, 2013.

* cited by examiner

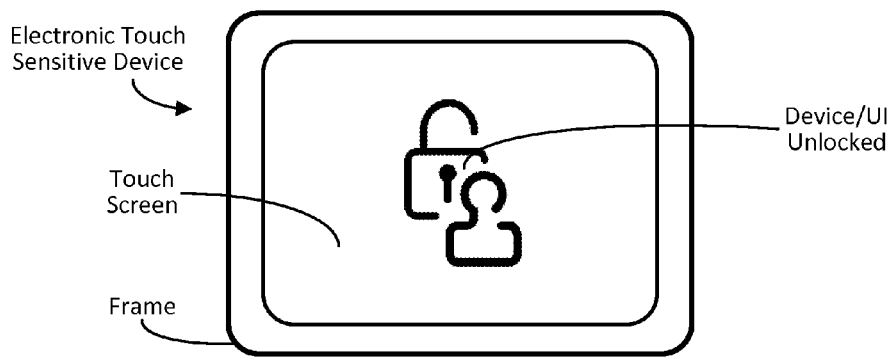
Fig. 3a
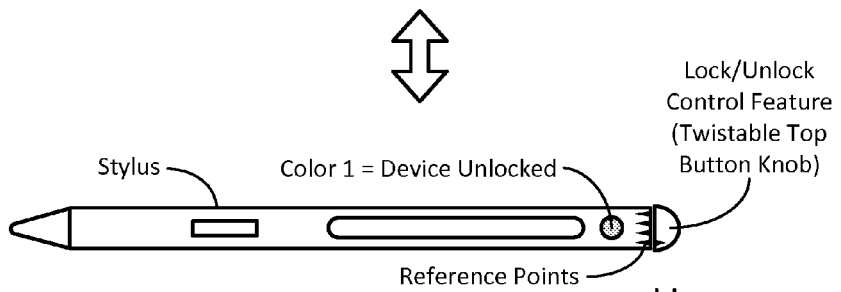
Fig. 3b
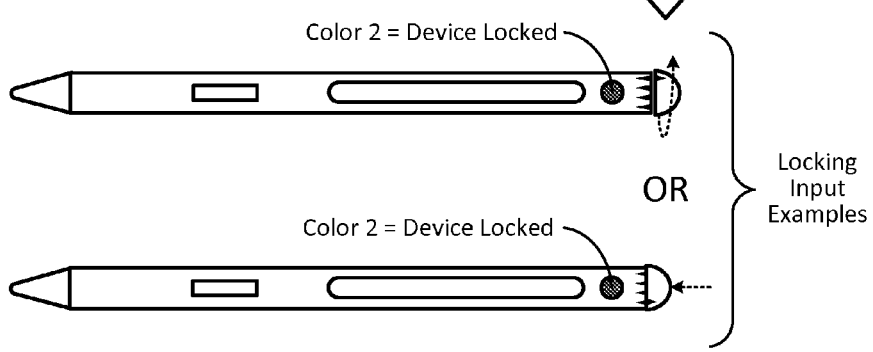
Fig. 3c
Fig. 3c'
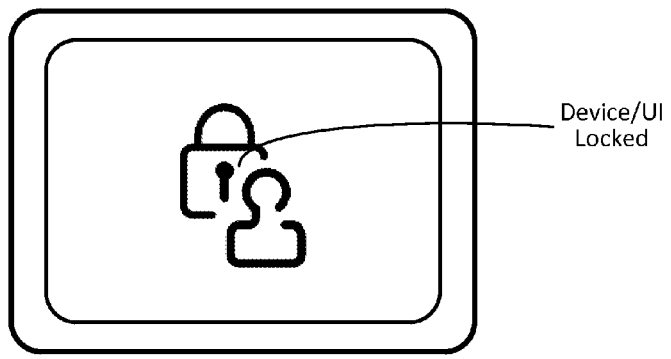
Fig. 3d

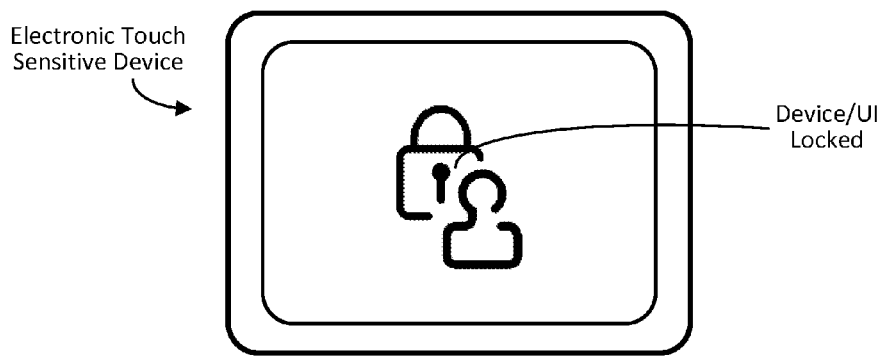
Fig. 4a
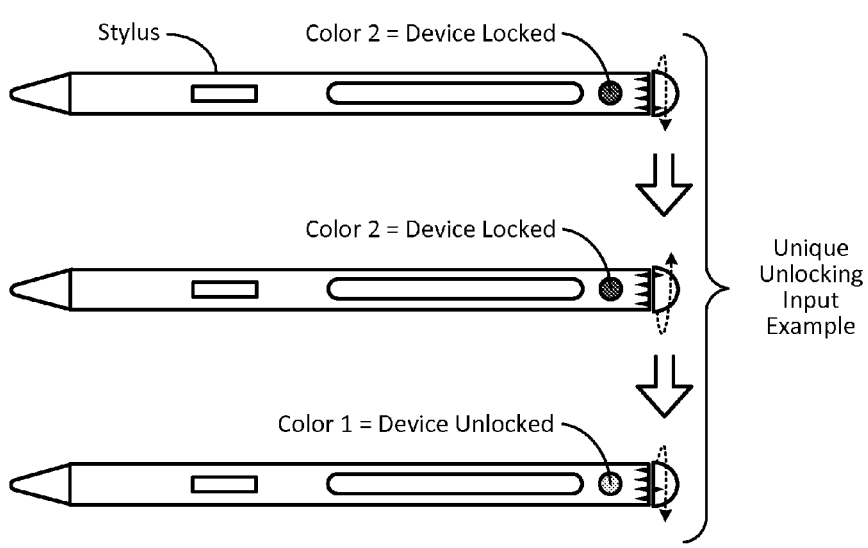
Fig. 4b
Fig. 4b'
Fig. 4b''
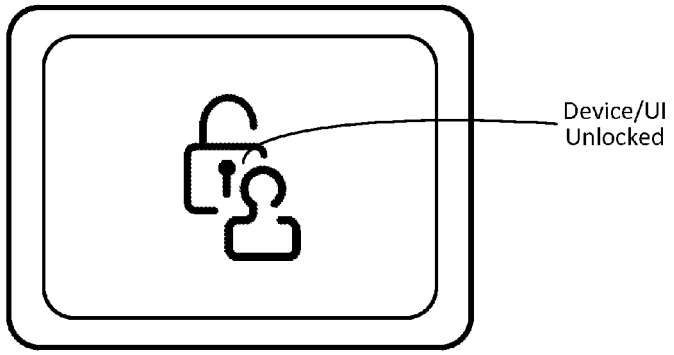
Fig. 4c

STYLUS CONTROL FEATURE FOR LOCKING/UNLOCKING TOUCH SENSITIVE DEVICES

FIELD OF THE DISCLOSURE

This disclosure relates to electronic computing devices, and more particularly, to techniques for locking and unlocking touch sensitive devices using a stylus.

BACKGROUND

Electronic devices such as tablets, eReaders, mobile phones, smart phones, personal digital assistants (PDAs), and other such touch sensitive electronic devices are commonly used for displaying consumable content. The content may be, for example, an e-book, an online article, images, documents, or video, just to name a few types. Such devices are also useful for displaying a user interface that allows a user to interact with the displayed content. The user interface may include, for example, a locked state where a lock screen is displayed limiting interaction with the user interface, and therefore the device, until it is unlocked (e.g., after a password is provided). The user may interact with the touch sensitive device using fingers and/or a stylus. The use of a stylus may enhance the user's experience when interacting with the touch sensitive device. For example, using a stylus may increase the user's input accuracy or comfort, especially when writing or drawing on the touch sensitive device.

BRIEF DESCRIPTION OF THE DRAWINGS

FIGS. 3a-c illustrate an example stylus device lock function using a stylus control feature, in accordance with an embodiment of the present invention.

FIG. 3d illustrates a device in a locked state after a locking input has been entered on a stylus, in accordance with an embodiment of the present invention.

FIGS. 4a-c illustrate an example stylus device unlock function using a stylus control feature, in accordance with an embodiment of the present invention.

DETAILED DESCRIPTION

Figure 1A:
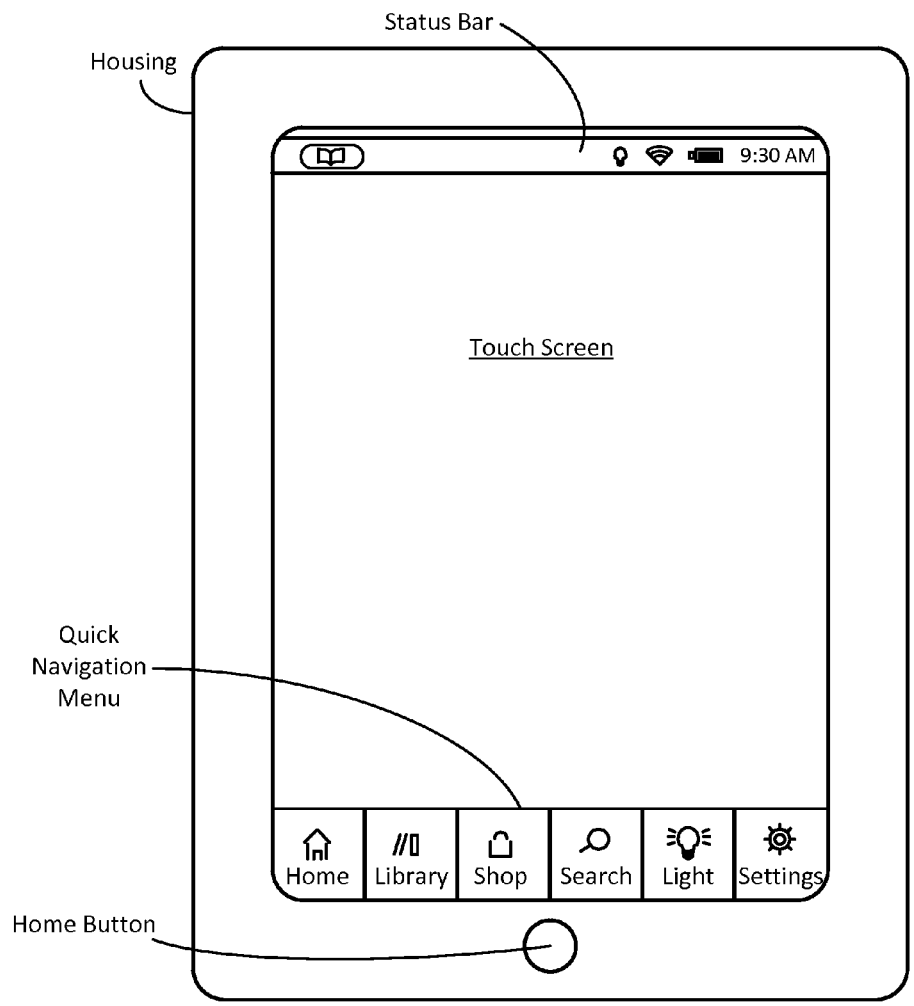
FIGS. 1a-b illustrate an example electronic touch sensitive device capable of being locked and/or unlocked using a stylus control feature, in accordance with an embodiment of the present invention.

Techniques are disclosed for locking and/or unlocking a touch sensitive device using one or more stylus control features. For example, the stylus control feature may be a twistable top button knob. In some instances, the twistable top button knob may be rotated and/or depressed to lock a related device. In some other instances, the twistable top button knob may be used to unlock a related device using a unique rotation sequence, thereby providing a security mechanism. For example, the unlocking sequence may require a user to rotate the twistable top button knob in a first direction to a first reference point, in a second direction to a second reference point, and back in the first direction to a third reference point. The stylus may also include a feedback indicator, such as a multi-colored light-emitting diode (LED), that indicates the lock status of a related device, for example. Numerous variations and configurations will be apparent in light of this disclosure.

General Overview

As previously described, electronic touch sensitive devices such as tablets, eReaders, and smart phones are commonly used for displaying user interfaces and consumable content. As was also previously explained, such devices oftentimes are capable of transitioning from a lock mode to an unlock mode in response to a user performing an unlock gesture on the device. As such, the user must interact directly with the device touch sensitive surface, which may not always be desirable.

Thus, and in accordance with an embodiment of the present invention, techniques are disclosed for locking and/or unlocking a touch sensitive device using one or more stylus lock/unlock control features. The stylus lock/unlock control feature(s) may include a twistable top button knob, a rotatable ring, one or more buttons, a scroll wheel, and/or some other suitable control feature that allows for the locking and/or unlocking of a related touch sensitive device from the stylus itself. In other words, the styluses described herein can lock and/or unlock a related touch sensitive device without a user having to touch the device in any way (although, in some cases, the device may be used to initially configure the stylus lock/unlock control feature). As will be apparent in light of this disclosure, the stylus lock/unlock control feature(s) may be configured to lock a related device using a locking input and/or unlock the related device using an unlocking input.

In some embodiments, the device may be unlocked by the stylus lock/unlock control feature using a unique unlocking input, thereby acting as a security mechanism. For example, in one embodiment, the stylus may include a twistable button knob at one end of the stylus that unlocks a related device when the knob is rotated in a unique combination or pattern. In this example embodiment, the unique unlocking combination may be preset and/or user-configurable. In some embodiments, the device may be locked by the stylus lock/unlock control feature using a quick and convenient locking input sequence. For example, continuing with the twistable button knob stylus embodiment, the stylus may be configured to lock the device when rotated at least 180 degrees in either direction or when the knob is depressed, thereby providing a quick and convenient method of locking the device from the stylus.

In some embodiments, the stylus may include a feedback indicator that provides information relating to the device lock status and/or unlocking sequence input. The indicator may provide feedback that is visual (e.g., using a multi-color light-emitting diode (LED) display), aural (e.g., using speakers), haptic (e.g. using a motor and eccentric weight), or some combination thereof. For example, in one embodiment, a stylus having a lock/unlock control feature may include a multi-color LED display that may turn red when the device is locked, green when the device is unlocked, and yellow when an improper unlocking input has been entered. Numerous variations and configurations will be apparent in light of this disclosure.

Device and Stylus Examples

Figure 1B:
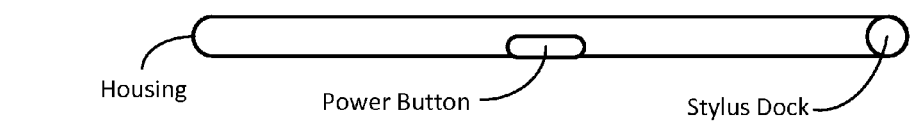

FIGS. 1a-b illustrate an example electronic touch sensitive device capable of being locked and/or unlocked using a stylus control feature, in accordance with an embodiment of the present invention. The device could be, for example, a tablet such as the NOOK® tablet or eReader by Barnes & Noble. In a more general sense, the device may be any electronic device having a touch sensitive user interface. The device may also have capability for displaying content to a user, such as a mobile phone or mobile computing device such as a laptop, a desktop computing system (with a built-in or separate monitor), a television, a smart display screen, or any other device having a touch screen display or a non-touch display screen that can be used in conjunction with a touch sensitive surface. In a more general sense, the touch sensitive device may comprise any touch sensitive device with built-in componentry to accept/recognize input from a stylus with which the device can be paired so as to allow for stylus input, including locking/unlocking functionality as described herein. As will be appreciated, the claimed invention is not intended to be limited to any particular kind or type of electronic touch sensitive device.

As can be seen with this example configuration, the device comprises a housing that includes a number of hardware features such as a power/lock button and a press-button (sometimes called a home button herein). The device in this example also includes a stylus dock capable of receiving a stylus (such as the stylus shown in FIG. 1c) for convenient storage. A touch screen based user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such user interface (UI) touch screen features, or different UI touch screen features altogether, depending on the target application of the device. Any such general UI controls and features can be implemented using any suitable conventional or custom technology, as will be appreciated.

The power/lock button of this example configuration can be used to turn the device on and off, and may be used in conjunction with a touch-based UI control feature that allows the user to confirm a given power transition action request (e.g., such as a slide bar or tap point graphic to turn power off). The power/lock button can also be used to lock/unlock the device, or to assist with the locking/unlocking process. In this example configuration, the device may be configured to lock the UI when the power/lock button is pressed, thereby displaying a lock screen until the device is unlocked. When the device is locked, or shortly thereafter, it may enter a sleep mode to conserve power, where the device's display may turn off until, for example, the power/lock button is pressed. Once the button is pressed to awaken the device (and turn on the device display if it is off), the display may show the lock screen where the user can enter the appropriate passkey to unlock the device. In this example configuration, the device may also be locked and/or unlocked using the stylus lock/unlock control feature(s), as will be discussed in turn with reference to FIG. 1c.

The home button of the device configuration shown in FIGS. 1a-b is a physical press-button that can be used when the device is awake and in use, to display the quick navigation menu, which is a toolbar that provides quick access to various features of the device. The button may control other functionality if, for example, the user presses and holds the home button, such as locking the device in a manner similar to the power/lock button, as previously described. For instance, an example such push-and-hold function could lock the device and engage a power conservation routine where the device is put to sleep or an otherwise lower power consumption mode. Numerous other configurations and variations will be apparent in light of this disclosure, and the electronic touch sensitive devices described herein are not intended to be limited to any particular set of hardware buttons or features, or device form factor.

Figure 1C:
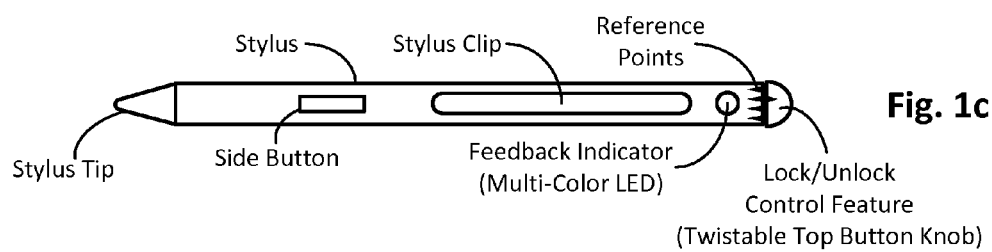
FIG. 1c illustrates an example stylus having a lock/unlock control feature for use with an electronic touch sensitive device, in accordance with an embodiment of the present invention.

FIG. 1c illustrates an example stylus having a lock/unlock control feature for use with an electronic touch sensitive device, in accordance with an embodiment of the present invention. As can be seen, in this particular example, the stylus includes a stylus tip used to contact (or otherwise hover over) the touch sensitive surface (e.g., through direct or proximate contact) and a stylus clip. In this example, the stylus tip has a triangular shape, while in other examples, the stylus tip may be more rounded, or any other suitable shape. The stylus tip may be made of any number of materials of different textures and firmness depending on the needs of the specific touch sensitive device. This example stylus configuration also includes a side button along the shaft of the stylus and a lock/unlock control feature.

Styluses capable of locking and/or unlocking related touch sensitive devices as described herein include at least one lock/unlock control feature. However, they may include other control features as well, such as the side button illustrated in FIG. 1c. Such control features (whether used to lock and/or unlock related devices or not) may include, for example, a scroll wheel, a switch, a sliding control bar, or any other suitable control feature that will be apparent in light of this disclosure. The styluses may be a resistive or capacitive stylus, an active stylus, or any other suitable implement for interacting with the touch sensitive surface. The locking and/or unlocking input and evaluation of that input, as well as the feedback provided, will depend on the specific hardware/software/firmware of the stylus and/or the touch sensitive device. For example, a stylus having a microphone and supporting circuitry as a control feature may allow for speaking interaction to generate locking and/or unlocking inputs. For ease of description, stylus examples are provided with a twistable top button knob lock/unlock control feature, such as that shown in FIGS. 1c, 3b, 3c-c', and 4b-b". However, the claimed invention is not intended to be limited to any particular kind or type of stylus. The claimed invention is also not intended to be limited to any particular kind or type of stylus lock/unlock control feature(s).

The supporting circuitry and/or software used for locking and/or unlocking a related electronic touch sensitive device using a stylus lock/unlock control feature in accordance with one or more embodiments may be included in the stylus or the touch sensitive device, or a combination of the stylus and the device, as will be apparent. To this end, the degree of intelligence and memory in styluses having one or more lock/unlock control features as described herein may vary. For example, some stylus embodiments may include enough intelligence and memory to determine whether a proper locking or unlocking input has been entered via the stylus lock/unlock control feature and subsequently send a lock or unlock signal to a related device (e.g., using the communication link discussed in turn with reference to FIG. 2d). In some other embodiments, the stylus lock/unlock control feature input may be evaluated by the touch sensitive device to determine if the input is proper locking or unlocking input. In some embodiments, reference points, such as the reference points shown in FIG. 1c, may be provided on the stylus or stylus lock/unlock control feature to assist a user when entering locking and/or unlocking inputs, particularly when unique unlocking inputs are used as a security mechanism. Unique unlocking (or locking) inputs may include a unique pattern, sequence, and/or passkey. In this example embodiment, the reference points are visual to indicate different twisting or rotating reference points. The reference points may also be individually identified (e.g., using numbers or some other indicia). The reference points may depend upon the lock/unlock control feature(s) being used. For example, the twistable top button knob control feature may have tactile reference points for the button portion of this lock/unlock control feature, whereby different depression depth reference points are felt by a user when pushing the top button.

The example stylus shown in FIG. 1c also includes a feedback indicator that can provide information relating to the device lock status and/or the unlocking sequence input, as will be apparent in light of this disclosure. As previously described, the indicator may provide feedback that is visual (e.g., using a multi-color LED display), aural (e.g., using speakers), haptic (e.g., using a motor and eccentric weight), or some combination thereof. In this example stylus, the indicator provides visual feedback using a multi-colored LED. The indicator may give feedback related to whether a related device is locked or unlocked, or whether a proper or improper unlocking input was entered. For example, the multi-colored LED feedback indicator of this embodiment may be configured to flash for a duration of time, blink, or constantly display the color red when a related device is locked, green when a related device is unlocked (e.g., when a proper unlocking input has been entered), and/or yellow when an improper unlocking input has been entered. In some cases, the feedback indicator may be used to assist with setting up unique unlocking inputs from the stylus itself. For example, in embodiments where the lock/unlock functions can be configured from the stylus itself, a programming sequence may be used where a user enters a default or initial input to be able to set a desired unique unlocking input and the feedback indicator assists with the programming. In this example, the feedback indicator may blink red when the programming sequence has initiated and turn green when a newly desired unique unlocking input has been entered for the stylus lock/unlock control feature. Numerous variations and configurations of the stylus lock/unlock control feature and feedback indicator will be apparent in light of this disclosure.

FIGS. 1 d-e illustrate example configuration screen shots of the electronic touch sensitive device shown in FIGS. 1a-b, configured in accordance with an embodiment of the present invention. In one particular embodiment, a Stylus Lock/Unlock configuration sub-menu, such as the one shown in FIG. 1e, may be accessed by tapping or otherwise selecting the Settings option in the quick navigation menu, which causes the device to display the general sub-menu shown in FIG. 1d. From this general sub-menu the user can select any one of a number of options, including one designated Security in this specific example case. Selecting this sub-menu item (with an appropriately placed screen tap) may cause the Stylus Lock/Unlock configuration sub-menu of FIG. 1e to be displayed, in accordance with an embodiment. In other example embodiments, selecting the Security option may present the user with a number of additional sub-options, one of which may include a so-called Stylus Lock/Unlock option, which may then be selected by the user so as to cause the Stylus Lock/Unlock configuration sub-menu of FIG. 1 e to be displayed.

Any number of such menu schemes and nested hierarchies can be used, as will be appreciated in light of this disclosure. In other embodiments, the stylus lock/unlock functionality may be hard-coded such that no configuration sub-menus are needed or otherwise provided. In some embodiments, the stylus lock/unlock functionality may be configurable from the stylus itself. For example, the unique unlocking sequence may be set using the stylus lock/unlock control feature. In this example, the stylus may come configured with a preset unlocking sequence that may be used to allow a user to configure the stylus with a different unique unlocking sequence, all from the stylus itself. The degree of hard-coding versus user-configurability can vary from one embodiment to the next, and the claimed invention is not intended to be limited to any particular configuration scheme of any kind.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch in a given location into an electrical signal which is then received and processed by the underlying operating system (OS) and circuitry (processor, etc.). The user touch may be performed with a finger, a stylus, or any other suitable implement, unless otherwise specified. Additional example details of the underlying OS and circuitry in accordance with some embodiments will be discussed in turn with reference to FIG. 2a.

Figure 1D:
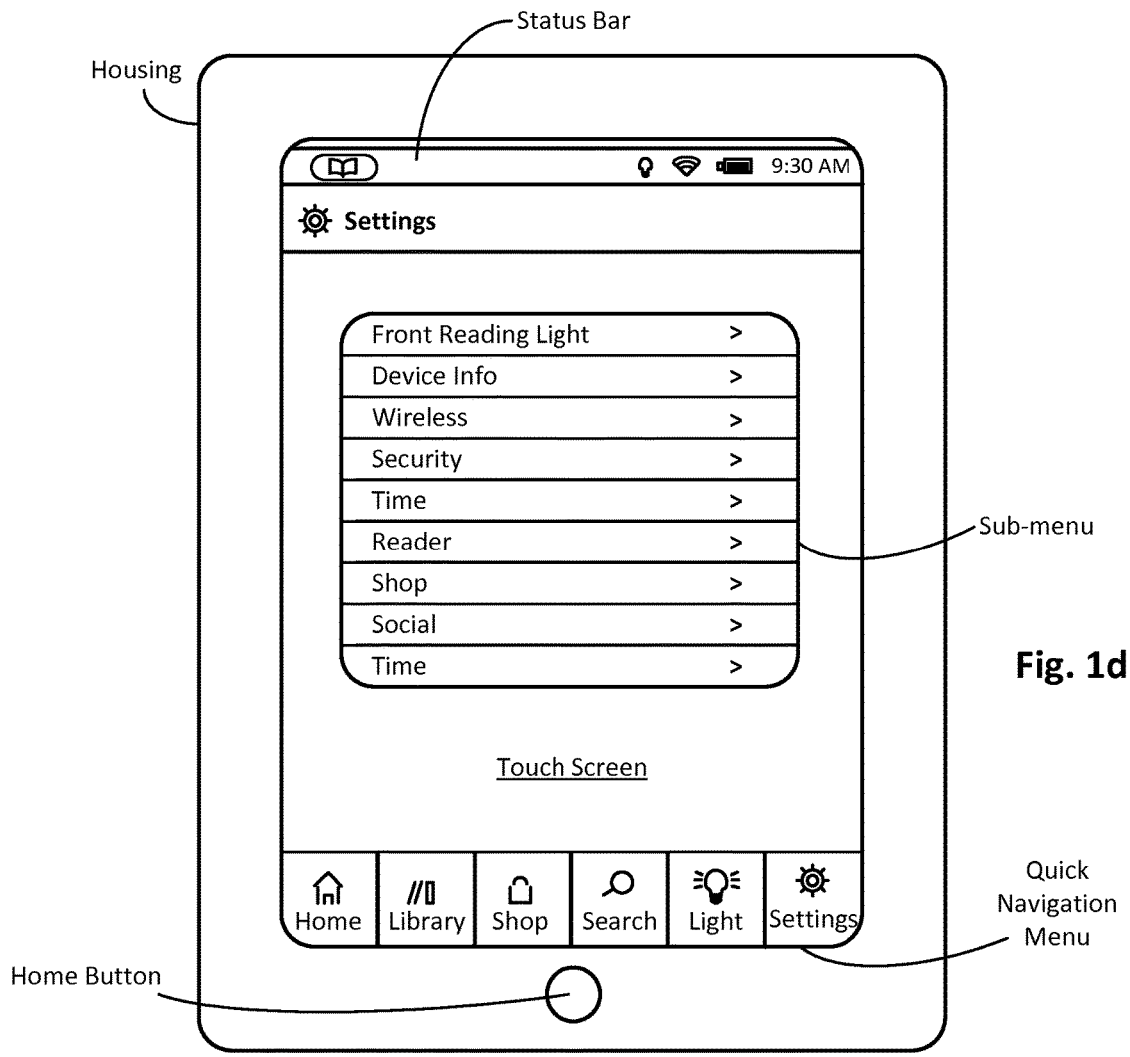
FIGS. 1d-e illustrate example configuration screen shots of the electronic touch sensitive device shown in FIGS. 1a-b, configured in accordance with an embodiment of the present invention.
Figure 1E:
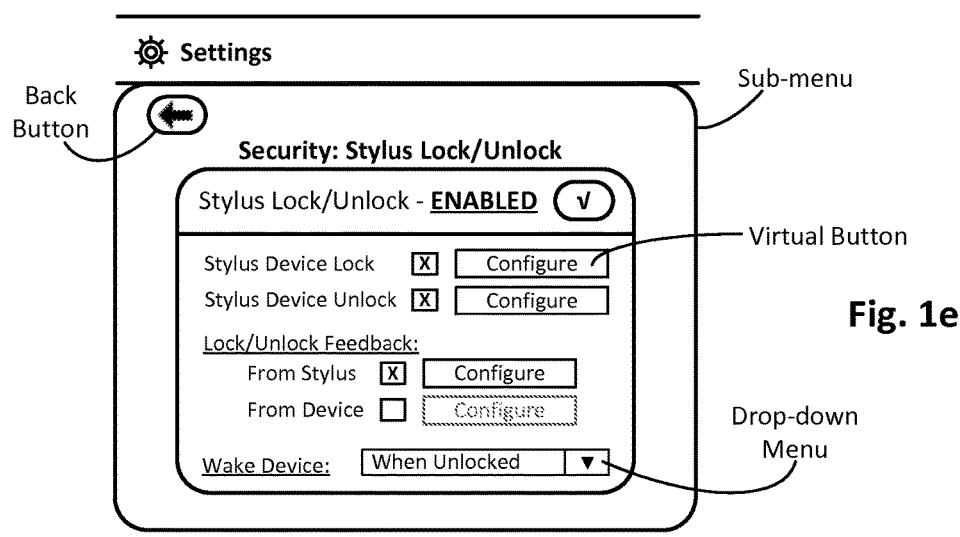

As previously explained, and with further reference to FIGS. 1d and 1e, once the Settings sub-menu is displayed (FIG. 1d), the user can then select the Security option. In response to such a selection, the Stylus Lock/Unlock configuration sub-menu shown in FIG. 1e can be provided to the user. The user can configure a number of options with respect to the Stylus Lock/Unlock functionality, in this example embodiment. For instance, in this example case, the configuration sub-menu includes a UI check box that when checked or otherwise selected by the user, effectively enables the Stylus Lock/Unlock functionality (shown in the enabled state); unchecking the box may disable the ability to lock and/or unlock the device using the stylus lock/unlock control feature, as discussed herein. Other embodiments may have the stylus lock/unlock functionality always enabled, for example.

In addition, the Stylus Lock/Unlock sub-menu of this example case includes settings options for independently enabling/disabling the Stylus Device Lock and Stylus Device Unlock capabilities (both shown as enabled). For example, if a user desired to only use the stylus to unlock a related touch sensitive device (and not be able to lock the related device from the stylus), the user could disable the Stylus Device Lock in this example embodiment. Configure virtual buttons are also provided for configuring the Stylus Device Lock and/or Unlock, in this example embodiment. When enabled, these options can be configured in various ways. For example, a user may be able to configure the stylus control feature that performs the locking and/or unlocking functions, the locking and/or unlocking inputs (e.g., the unlocking combination for a twistable button knob), and/or the type of communication link between the stylus and device, just to name a few examples. In some cases, a user can configure stylus lock/unlock functions from the stylus itself. For example, in stylus embodiments with a twistable top button knob lock/unlock control feature, a user may be able to set/program the unlocking combination from the stylus itself.

Further, the Stylus Lock/Unlock sub-menu of this example also includes settings options for independently enabling/disabling Lock/Unlock Feedback to set whether there is feedback From Stylus or feedback From Device. As previously described, the feedback provided may relate to whether the device is locked or unlocked, or whether a proper stylus lock/unlock control feature unlocking input was provided. Configure virtual buttons are also provided for configuring the Lock/Unlock Feedback. When enabled, the feedback options can be configured in this example in various ways. For example, in one embodiment where the stylus contains a multi-colored LED feedback indicator (such as that shown in FIG. 1c), a user may be able to configure the color and duration of the feedback given to indicate that a related device is locked or unlocked. The example shown in FIG. 1e also includes the ability to set the Wake Device action, i.e., what stylus action turns the device display back on when it is in a sleep or power conserving mode. As shown in this example case, the Wake Device action can be selected using a drop down menu and action options might include: Any Control Feature (i.e., the device awakens in response to interaction with any stylus control feature), Lock/Unlock Control Feature (i.e., the device awakens in response to any interaction with a stylus lock/unlock control feature), or the selected option of When Unlocked (i.e., the device awakens in response to a proper unlocking input from the stylus lock/unlock control feature). As previously described, the device may also be awakened by depressing the power/lock and/or home button on the device itself.

As can be further seen, a back button arrow UI control feature may be provisioned on the touch screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. Numerous other configurable aspects will be apparent in light of this disclosure. Again, while FIGS. 1d and 1e show user configurability, other embodiments may not allow for any such configuration, wherein the various features provided are hard-coded or otherwise provisioned by default.

Architecture

Figure 2A:
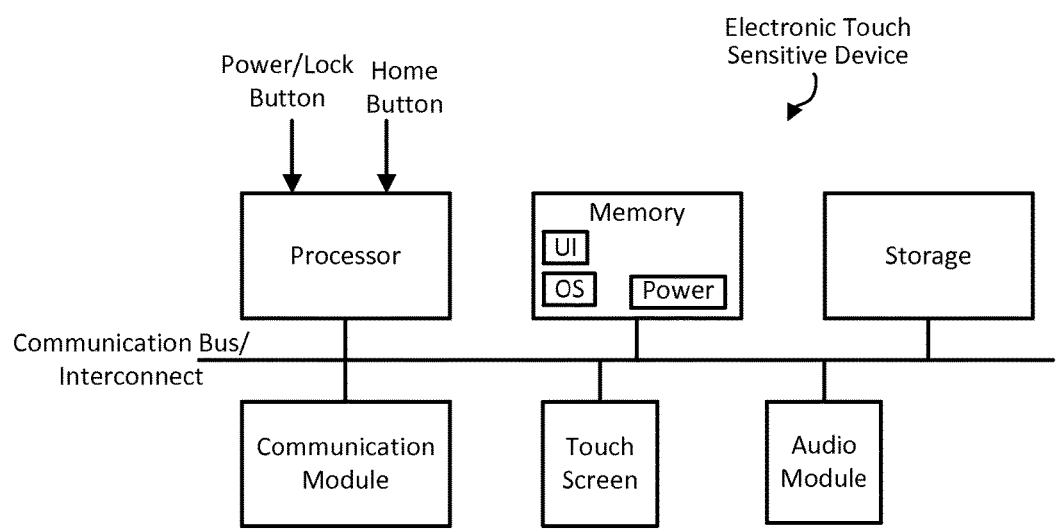
FIG. 2a illustrates a block diagram of an electronic touch sensitive device, configured in accordance with an embodiment of the present invention.

FIG. 2a illustrates a block diagram of an electronic touch sensitive device, configured in accordance with an embodiment of the present invention. As can be seen, this example device includes a processor, memory (e.g., RAM and/or ROM for processor workspace and storage), additional storage/memory (e.g. for content), a communications module, a touch screen, and an audio module. A communications bus and interconnect is also provided to allow inter-device communication. Other typical componentry and functionality not reflected in the block diagram will be apparent (e.g. battery, co-processor, etc.). Further note that although a touch screen display is provided, other embodiments may include a non-touch screen and a touch sensitive surface such as a track pad, or a touch sensitive housing configured with one or more acoustic sensors, etc. In any such cases, the touch sensitive surface is generally capable of translating a user's physical contact with the surface into an electronic signal that can be manipulated or otherwise used to trigger a specific user interface action, such as those provided herein. The principles provided herein equally apply to any such touch sensitive devices. For ease of description, examples are provided with touch screen technology.

The touch sensitive surface (touch sensitive display in this example) can be any device that is configured with user input detecting technologies, whether capacitive, resistive, acoustic, active or passive stylus, and/or other input detecting technology. The screen display can be layered above input sensors, such as a capacitive sensor grid for passive touch-based input (such as with a finger or passive stylus in the case of a so-called in-plane switching (IPS) panel), or an electro-magnetic resonance (EMR) sensor grid (e.g., for sensing a resonant circuit of the stylus). In some embodiments, the touch screen display can be configured with a purely capacitive sensor, while in other embodiments the touch screen display may be configured to provide a hybrid mode that allows for both capacitive input and EMR input. In still other embodiments, the touch screen display is configured with only an active stylus sensor. In any such embodiments, a touch screen controller may be configured to selectively scan the touch screen display and/or selectively report contacts detected directly on or otherwise sufficiently proximate to (e.g., within a few centimeters) the touch screen display. Numerous touch screen display configurations can be implemented using any number of known or proprietary screen based input detecting technology.

In one example embodiment, stylus interaction can be provided by, for example, placing the stylus tip on the stylus detection surface, or sufficiently close to the surface (e.g., hovering one to a few centimeters above the surface, or even farther, depending on the sensing technology deployed in the stylus detection surface) but nonetheless triggering a response at the device just as if direct contact were provided on a touch screen display. As will be appreciated in light of this disclosure, an styluses as used herein may be implemented with any number of stylus technologies, such as the technology used in DuoSense® pens by N-trig® (e.g. wherein the stylus utilizes a touch sensor grid of a touch screen display) or EMR-based pens by Wacom technology, or any other commercially available or proprietary stylus technology. Further recall that the stylus sensor in the computing device may be distinct from an also provisioned touch sensor grid in the computing device. Having the touch sensor grid separate from the stylus sensor grid may allow the device to, for example, only scan for a stylus input, a touch contact, or to scan specific areas for specific input sources, in accordance with some embodiments. In one such embodiment, the stylus sensor grid includes a network of antenna coils that create a magnetic field which powers a resonant circuit within the stylus. In such an example, the stylus may be powered by energy from the antenna coils in the device and the stylus may return the magnetic signal back to the device, thus communicating the stylus' location, lock/unlock control feature input, etc. Such an example embodiment may also eliminate the need for a battery on the stylus.

Continuing with the example electronic touch sensitive device embodiment shown in FIG. 2a, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine readable medium, that when executed by the processor (and/or co-processors), carries out the functionality of the device including a stylus lock/unlock function as described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g. 800 MHz Texas Instruments OMAP3621 applications processor), and may include one or more co-processors or controllers to assist in device control. In this example case, the processor receives input from the user, including input from or otherwise derived from the power button and the home button of the device and input from or otherwise derived from the stylus lock/unlock control feature(s). The processor can also have a direct connection to a battery so that it can perform base level tasks even during sleep or low power modes, such as receiving and/or evaluating stylus unlock inputs. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 6-inch E-ink Pearl 800×600 pixel screen with Neonode® zForce® touch screen, or any other suitable display and touch screen interface technology.

The communications module can be configured to execute, for instance, any suitable protocol which allows for connection to the stylus so that input from the stylus lock/unlock control feature(s) can be received from the stylus and feedback can be sent to the stylus. Example communications modules may include an NFC (near field connection), Bluetooth, 802.11b/g/n WLAN, or other suitable chip or chip set that allows for wireless connection to the stylus (including any custom or proprietary protocols). In some embodiments, a wired connection can be used between the stylus and device. In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc.). The device may be smaller, for example, for smartphone, eReader, and tablet applications and larger for smart computer monitor applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured, for example, to automatically transition the device to a low power consumption or sleep mode after a period of non-use. The device may be configured to lock when it enters a sleep mode (or after a predetermined period of time) for security purposes. A wake-up from that sleep mode can be achieved, for example, by a physical button press and/or a touch screen swipe or other action. When the device locks, an additional passkey entry may be required to unlock the device. In some embodiments, the device may stay asleep (or the device display stays off) until a proper stylus unlock input is entered to unlock the device.

The user interface (U) module can be, for example, based on touch screen technology and the various example screen shots shown in FIGS. 1a, 1d-e, 3a, 3d, 4a, and 4c in conjunction with the stylus based unlock/lock methodologies demonstrated in FIG. 5, which will be discussed in turn. The audio module can be configured, for example, to speak or otherwise aurally present information related to locking and/or unlocking the device, or other virtual content, if preferred by the user. Numerous commercially available text-to-speech modules can be used to facilitate the aural presentation of the information, such as Verbose text-to-speech software by NCH Software. In some example cases, if additional space is desired, for example, to store stylus lock/unlock sequences as described herein or other content, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Figure 2B:
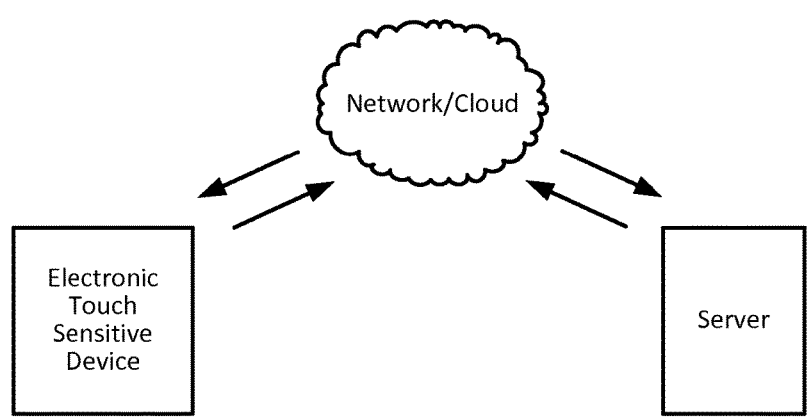
FIG. 2b illustrates a block diagram of a communication system including the electronic touch sensitive device of FIG. 2a, configured in accordance with an embodiment of the present invention.

FIG. 2b illustrates a block diagram of a communication system including the electronic touch sensitive device of FIG. 2a, configured in accordance with an embodiment of the present invention. As can be seen, the system generally includes an electronic touch sensitive device that is capable of communicating with a server via a network/cloud. In this example embodiment, the electronic touch sensitive device may be, for example, an eBook reader, a mobile cell phone, a laptop, a tablet, a desktop computer, or any other electronic touch sensitive computing device. The network/cloud may be a public and/or private network, such as a private local area network (e.g., home cloud) operatively coupled to a wide area network such as the Internet. In this example embodiment, the server may be programmed or otherwise configured to receive content requests from a user via the touch sensitive device and to respond to those requests by providing the user with requested or otherwise recommended content. In some such embodiments, the server is configured to remotely provision the stylus lock/unlock functionality as provided herein to the touch sensitive device (e.g., via JavaScript or other browser based technology). In other embodiments, portions of the methodology are executed on the server and other portions of the methodology are executed on the device. Numerous server-side/ client-side execution schemes can be implemented to facilitate the stylus lock/unlock functionality in accordance with an embodiment, as will be apparent in light of this disclosure.

Figure 2C:
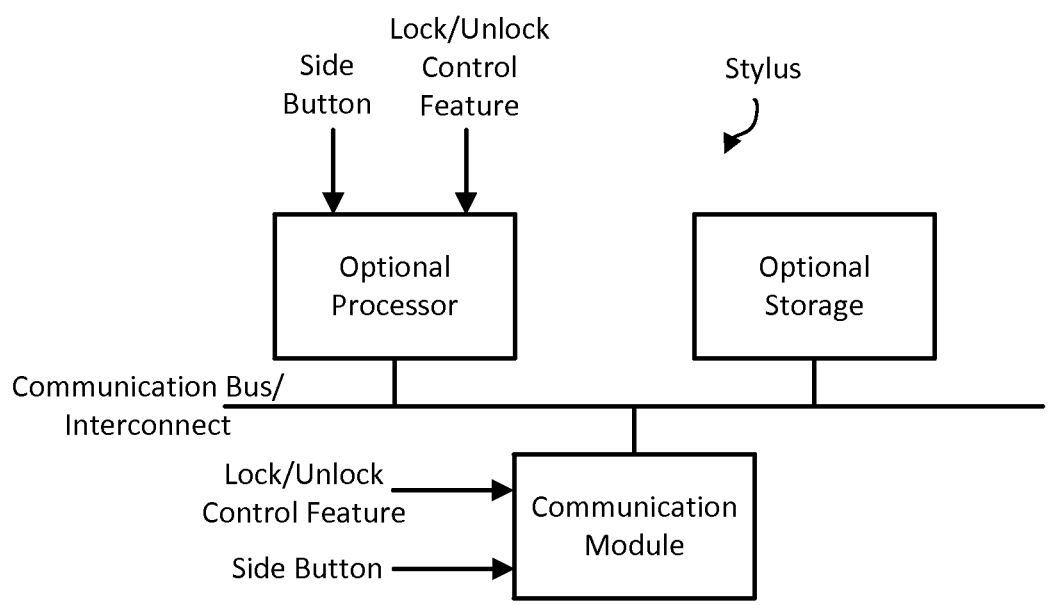
FIG. 2c illustrates a block diagram of an example stylus for use with an electronic touch sensitive device, configured in accordance with an embodiment of the present invention.

FIG. 2c illustrates a block diagram of an example stylus for use with an electronic touch sensitive device, configured in accordance with an embodiment of the present invention. As can be seen, this example stylus includes a communications module, a side button, and a top button. A communications bus and interconnect may be provided to allow inter-device communication. An optional processor may also be included in the stylus to provide local intelligence, but such is not necessary in embodiments where the touch sensitive device with which the stylus is communicatively coupled provides the requisite control and direction, including whether proper lock and/or unlock inputs have been entered using the stylus lock/unlock control feature(s). Optional storage may also be included in the stylus, for example, for storing stylus unlocking input sequences. Other componentry and functionality not reflected in the block diagram will be apparent (e.g., battery, speaker, antenna, etc.). The optional processor can be any suitable processor and may be programmed or otherwise configured to assist in controlling the stylus, and may receive input from the user from control features, including the lock/unlock control feature(s). The optional storage may be implemented with any suitable memory and size (e.g., 2 to 4 GBytes of flash memory).

The communications module can be, for instance, any suitable module which allows for connection to a nearby electronic device so that input from the stylus lock/unlock control feature(s) may be transmitted to the device and lock/unlock data may be received from the device (such as whether the device is in a locked or unlocked state). In some embodiments, the stylus may be connected to a related device using a wire, where the wire allows the stylus to receive information from and/or transmit information to the related device. In other embodiments, the communication module may be wireless and use any number of short-range or long-range wireless communication technologies, such as near field communication (NFC), radio-frequency identification (RFID), Bluetooth, Wi-Fi, electromagnetic, infrared or other light communication technologies, radio frequency (RF) or other radio communication technologies, or any other suitable communication technology. In this example case, the communication module can receives input from the user from the stylus lock/unlock control features (as well as other control features), wherein such inputs can be used to enable the transmit function of the communications module. In one embodiment, the stylus includes memory storage and a transceiver, but no dedicated processor. In such an embodiment, the processor of the electronic device communicates with the transceiver of the stylus and executes functions based on the stylus lock/unlock control feature(s).

Conventional or custom discovery and handshake protocols can be used to introduce or otherwise relate a given stylus with a given device, in accordance with some embodiments. In some such cases, a software driver that comes with the stylus can be loaded onto the target electronic device, so as to enable the communication between the device and stylus as well as the functionality described herein. Such plug and play functionality can be implemented using any number of suitable self-discovery based communication protocols. Depending on the target price point of the stylus, such protocols may be heavy (e.g., Wi-Fi) or light (e.g. NFC or Bluetooth). In some embodiments, the pairing or relating of the device and stylus may be required before the stylus lock/unlock functionality described herein can be used. In some cases, the stylus locking/unlocking functionality may be configured when pairing or relating the device and stylus. For example, a user may be required to enter a unique unlocking input when pairing a device with a stylus having the stylus lock/unlock functionality described herein.

Figure 2D:
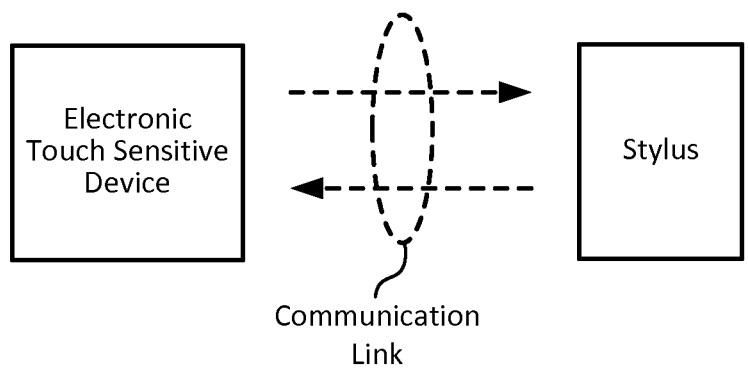
FIG. 2d illustrates a block diagram showing a communication link between the electronic touch sensitive device of FIG. 2a and the stylus of FIG. 2c, according to one or more embodiments of the present invention.

FIG. 2d illustrates a block diagram showing a communication link between the electronic touch sensitive device of FIG. 2a and the stylus of FIG. 2c, according to one or more embodiments of the present invention. As can be seen, the system generally includes an electronic touch sensitive device that is capable of wirelessly connecting to other devices and a stylus that is also capable of wirelessly connecting to other devices. In this example embodiment, the electronic touch sensitive device may be, for example, an e-Book reader, a mobile cell phone, a laptop, a tablet, a desktop computer, or any other touch sensitive computing device. As described above, the communication link may include an NFC, Bluetooth, 802.11 b/g/n WLAN, electromagnetic resonance, or other suitable communication link which allows for the transfer of data between an electronic touch sensitive device and one or more styluses. For example, after a communication link is established (e.g., via a Bluetooth connection), that link may be used to transfer information relating to: input from one or more stylus lock/unlock control features, device lock status, feedback indicator data, or other various information relating to the stylus lock/unlock functionality described herein. In other example embodiments, the stylus may communicate with the electronic touch sensitive device through a cloud/network to send signals relating to input from the stylus lock/unlock control feature(s) indirectly to the device. For example, after the proper unlocking input is entered using the stylus lock/unlock control feature(s), an unlock signal may be sent through a cloud/network to the electronic touch sensitive device. Numerous variations and configurations will be apparent in light of this disclosure.

Example Stylus Device Lock/Unlock Functions

FIGS. 3a-c illustrate an example stylus device lock function using a stylus control feature, in accordance with an embodiment of the present invention. Generally, FIG. 3a shows an electronic touch sensitive device in an unlocked state. FIG. 3b shows a stylus having a lock/unlock control feature (specifically a twistable top button knob) indicating that the related device shown in FIG. 3a is in an unlocked state, FIG. 3c-c' show two locking input examples using the stylus of FIG. 3b to lock the related device, and FIG. 3d shows the related device in a locked state after the locking input was entered on the stylus (the locked state is indicated on the styluses shown in FIGS. 3c-c'). A stylus having a twistable top button knob lock/unlock control feature is used for illustrative purposes. However, any suitable stylus control feature could be used as was previously described.

As can be seen in FIG. 3a, a physical frame or support structure is provided about the touch screen of the electronic tough sensitive device. The device and/or the UI of the device is shown in an unlocked state as indicated by the unlocked user icon displayed on the touch screen. The device may be a smart phone, eReader, tablet, or any other electronic touch sensitive device. FIG. 3b shows an example stylus having a lock/unlock control feature as described herein. The example stylus shown in FIG. 3b (as well as FIGS. 3c-c' and 4b-b") is the same stylus as shown in FIG. 1c and therefore includes the same components: a stylus clip, a side button, a feedback indicator (specifically a multi-colored LED), a lock/unlock control feature (specifically a twistable top button knob), and reference points. As can be seen, the feedback indicator is displaying a first color (Color 1) to indicate that the related device shown in FIG. 3a is unlocked.

FIGS. 3c-c' show two locking input examples using the stylus of FIG. 3b to lock a related device. In some cases, the locking input may consist of an easily-identifiable action (such as the locking inputs illustrated in FIGS. 3c and 3c'). In some other cases, the locking input may consist of a unique action or a unique series of actions to add a security mechanism to the stylus device lock function (such as the input sequence which will be described in turn with reference to FIGS. 4b-b''). FIG. 3c shows a locking input example consisting of rotating the stylus' twistable top button knob to lock a related device. In this example, the stylus lock function may be configured to lock the device only after the knob has been rotated a certain amount (e.g., 180 degrees, 360 degrees, etc.). In some instances, the reference points may also be used for the locking input. For example, the stylus lock function may be configured to lock the device only after the knob of FIG. 3c has been rotated past a certain amount of reference points (e.g., two, four, etc.). As previously described, the actual evaluation of the user input may be evaluated by the stylus and/or the device. FIG. 3c' shows another locking input example consisting of depressing the stylus' twistable top button knob to lock a related device. In this example, the stylus lock function may be configured to lock the device only after the knob has been depressed a certain amount (e.g., a maximum amount, half of the maximum amount, etc.). As can be seen, the feedback indicator changed to display a second color (Color 2) to indicate that the related device has been locked, as shown in FIG. 3d (and as is also indicated by the locked user icon displayed on the touch screen). In some instances, the display of the device shown in FIG. 3d (i.e., the touch screen) may turn off when the device is locked, as previously described.

FIGS. 4a-c illustrate an example stylus device unlock function using a stylus control feature, in accordance with an embodiment of the present invention. Generally, FIG. 4a shows an electronic touch sensitive device in a locked state, FIGS. 4b-b'' show an unlocking input example using the stylus of FIG. 3b to unlock the related device shown in FIG. 4a, and FIG. 4c shows the related device in an unlocked state after the unlocking input was entered on the stylus.

FIG. 4a shows an electronic touch sensitive device in a locked state as is indicated by the locked user icon displayed on the touch screen. FIGS. 4b-b'' show an unlocking input example using the stylus of FIG. 3b to unlock a related device. In some cases, the unlocking input may consist of easily-identifiable action (such as the knob rotating action or button pushing action described in FIGS. 3c and 3c', respectively). In some other cases, the locking input may consist of a unique action or a unique series of actions to add a security mechanism to the stylus device unlock function (such as the unique unlocking input illustrated in FIGS. 4b-b''). FIGS. 4b-b'' show an unique unlocking input example consisting of rotating the twistable top button knob in a first direction to a first reference point (FIG. 4b), rotating the knob in a second direction to a second reference point (FIG. 4b'), and then rotating the knob in the first direction to a third reference point (FIG. 4b''). In this example, the first, second, and/or third reference points may be the same or different reference points. Further, in this example, the stylus unlock function may be configured to use a preset rotation sequence, requiring a user to only know the first, second, and third reference points for proper entry of the unique unlocking input (e.g., looking down at the knob: 1) twist twice counter-clockwise to the first reference point, 2) twist once clockwise to the second reference point, and 3) twist three times counter-clockwise to the third reference point). In another example, the unique unlocking input may be entered by pushing the twistable top button knob in a unique sequence, such as using a Morse code passkey.

As can also be seen in FIGS. 4b-b', the feedback indicator is shown displaying Color 2 to indicate that the related device is locked. After the unique unlocking input is entered in the third step of the sequence, shown in FIG. 4b'', the feedback indicator changed to display Color 1 to indicate that the related device has been unlocked, as shown in FIG. 4c (and as is also indicated by the unlocked user icon displayed on the touch screen).

As previously described, the inputs used for the stylus device lock and/or unlock functions, whether simple or unique, may be user-configurable, hard-coded, or some combination thereof. In some cases, the locking and/or unlocking input complexity and evaluation may be dependent upon the stylus lock/unlock control feature(s) being used to enter the unlocking input. In some instances, the available locking and/or unlocking inputs may be dependent upon the hardware/software/firmware of the stylus and/or the electronic touch sensitive device. The example stylus device lock function illustrated in FIG. 3 and the example stylus device unlock function illustrated in FIG. 4 are presented for illustrative purposes and are not intended to limit the claimed invention.

Methodology

Figure 5:
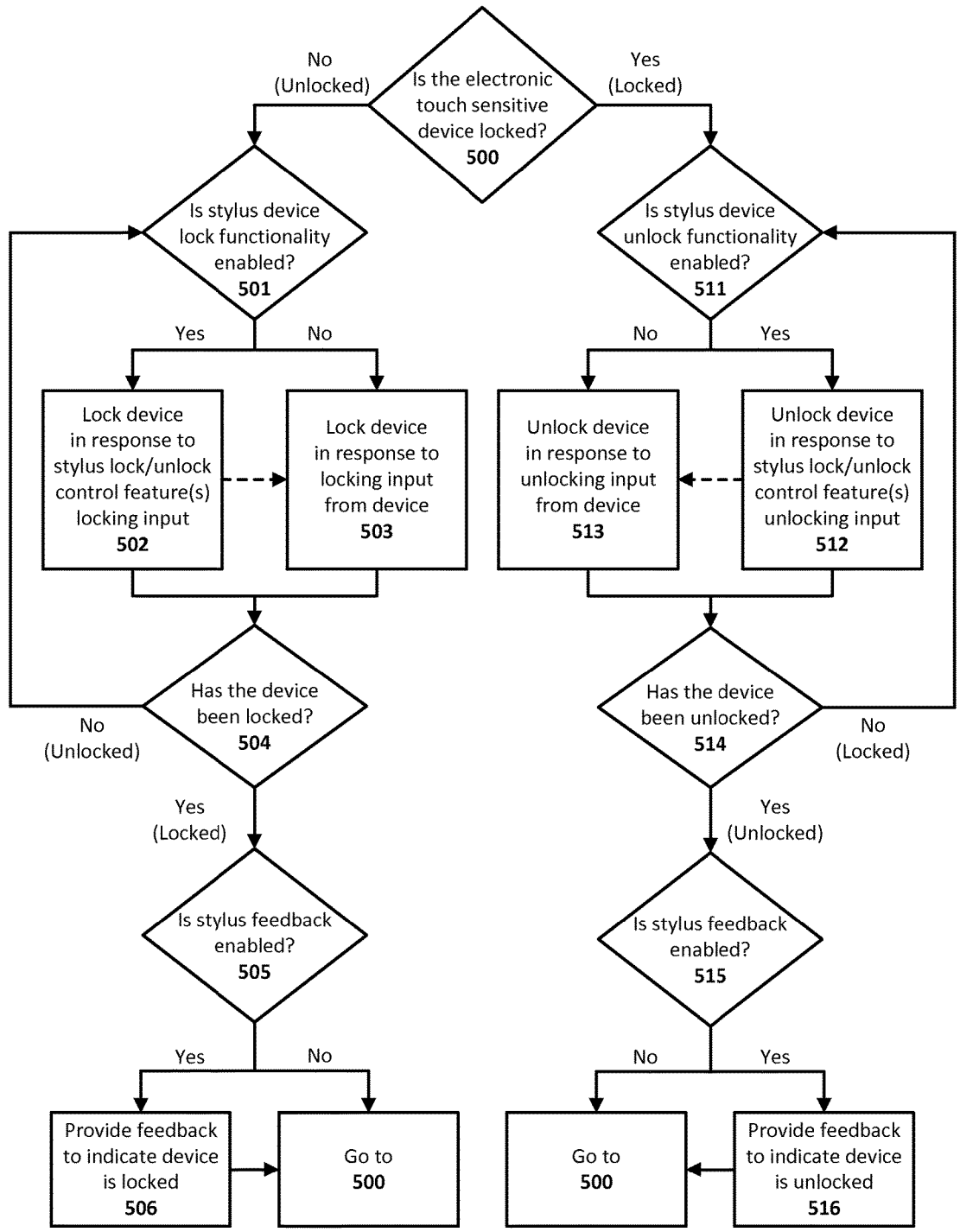
FIG. 5 illustrates a method for locking and/or unlocking an electronic touch sensitive device using a stylus control feature, in accordance with an embodiment of the present invention.

FIG. 5 illustrates a method for locking and/or unlocking an electronic touch sensitive device using a stylus control feature, in accordance with an embodiment of the present invention. The device may be a smart phone, eReader, tablet, or any other suitable electronic touch sensitive device. This example methodology may be implemented, for instance, by the UI module of the touch sensitive device shown in FIG. 2a or the touch sensitive device shown in FIG. 2b (e.g., with the UI provisioned to the client by the server). To this end, the UI can be implemented in software, hardware, firmware, or any combination thereof, as is appreciated in light of this disclosure.

As can be seen, in this example case, the method starts by determining whether the electronic touch sensitive device is locked 500. At this point, the feedback indicator of the stylus may have already indicated (or still be indicating) whether the related device is locked or unlocked. If the device is not locked (i.e., unlocked), then the method determines whether stylus device lock functionality is enabled 501. This may require determining if a stylus is being used, if that stylus has a lock/unlock control feature that can lock the device, and/or whether the stylus device lock function is enabled (e.g., see FIG. 1e). If the stylus device lock functionality is enabled, then the device may be locked in response to stylus lock/ unlock control feature(s) locking input 502. For example, the locking input may be one of the examples shown in FIG. 3c or 3c', or any other suitable locking input using a stylus lock/unlock control feature as described herein. If the stylus device lock functionality is not enabled, then the device may be locked in response to locking input from the device itself 503. In other words, where the stylus device lock functionality is not enabled, then the device can still be locked by, for example, pressing the power/lock button on the device, as was previously described. In some instances, the device may also be locked from the device itself even where the stylus device lock functionality is enabled (as indicated by the dotted arrow connecting 502 and 503), thus allowing the user to have two methods of locking the device—from the stylus or from the device.

The method continues by determining whether the device has been locked 504. If it has not (and is therefore still unlocked), then the method loops back to 501. If the device has been locked, then the method determines whether stylus feedback is enabled 505. This may require determining if a stylus is being used, if that stylus has a feedback indicator, and/or whether feedback from the stylus is enabled (e.g., see FIG. 1e). If stylus feedback is enabled, then feedback is provided from the stylus to indicate that the device is locked 506. For example, if the feedback indicator is a multi-colored LED (such as in the styluses of FIGS. 1c, 3b, 3c-c', and 4b-b"), then the LED may turn red to indicate that the device has been locked. In some instances, feedback may also or alternatively be provided by the device. After the feedback is provided to indicate that the device has been locked, the method loops back to 500 to determine whether the device is locked (in this case, it should be locked). If stylus feedback is not enabled, then the method loops back to 500 as well.

Continuing back from determining whether the device is locked 500, if the device is locked, then the method determines whether stylus device unlock functionality is enabled 511. This may require determining if a stylus is being used, if that stylus has a lock/unlock control feature that can unlock the device, and/or whether the stylus device unlock function is enabled (e.g., see FIG. 1e). If the stylus device unlock functionality is enabled, then the device may be unlocked in response to stylus lock/unlock control feature(s) unlocking input 512. For example, the unlocking input may be the unique sequence shown in FIGS. 4b-b" or any other suitable unlocking input using a stylus lock/unlock control feature as described herein. If the stylus device unlock functionality is not enabled, then the device may be unlocked in response to unlocking input from the device itself 513. In other words, where the stylus device unlock functionality is not enabled, then the device can still be unlocked by, for example, pressing the power/lock button on the device and entering the proper passkey at the lock screen, as was previously described. In some instances, the device may also be unlocked from the device itself as was just described even where the stylus device unlock functionality is enabled (as indicated by the dotted arrow connecting 512 and 513), thus allowing the user to have two methods of unlocking the device . . . from the stylus or from the device.

The method continues by determining whether the device has been unlocked 514. If it has not (and is therefore still locked), then the method loops back to 511. If the device has been unlocked, then the method determines whether stylus feedback is enabled 515. This may require determining if a stylus is being used, if that stylus has a feedback indicator, and/or whether feedback from the stylus is enabled (e.g., see FIG. 1e). If stylus feedback is enabled, then feedback is provided from the stylus to indicate that the device is unlocked 516. For example, if the feedback indicator is a multi-colored LED (such as in the styluses of FIGS. 1c, 3b, 3c-c', and 4b-b"), then the LED may turn green to indicate that the device has been unlocked. In some instances, feedback may also or alternatively be provided by the device. After the feedback is provided to indicate that the device has been unlocked, the method loops back to 500 to determine whether the device is locked (in this case, it should be unlocked). If stylus feedback is not enabled, then the method loops back to 500 as well.

Numerous variations and embodiments will be apparent in light of this disclosure. One example embodiment of the present invention provides a stylus including an elongated body portion having a stylus tip for interacting with an electronic touch sensitive device. The stylus also includes a control feature for providing user input to the device. The user input includes at least one of locking input that causes the device to transition from an unlock mode to a lock mode and/or unlocking input that causes the device to transition from a lock mode to an unlock mode. In some cases, the control feature is a twistable button knob that can be rotated and/or pressed to provide the locking and/or unlocking input. In some cases, the unlocking input and/or the locking input is user-configurable. In some cases, the unlocking input and/or the locking input is configurable from the stylus itself. In some cases, the unlocking requires a unique pattern, sequence, and/or passkey. In some cases, the body portion and/or control feature include reference points for assisting with entering the unlocking input. In some cases, the stylus includes a feedback indicator for indicating that the device is locked, the device is unlocked, the unlocking input is being configured, the unlocking input has been set, an improper unlocking input has been entered, and/or a proper unlocking input has been entered. In some cases, the feedback indicator includes a multi-colored light-emitting diode (LED), a speaker, and/or a motor attached to an eccentric weight. In some cases, the stylus is included in a system that also includes a touch sensitive device configured to receive input from the stylus. In some cases, the system (including the stylus and touch sensitive device configured to receive input from the stylus) is configured to determine if the unlocking input is sufficient to transition the touch sensitive device from lock mode to unlock mode.

Another example embodiment of the present invention provides a device including a touch sensitive area for receiving input from a stylus via at least one of direct or proximate contact between the stylus and touch sensitive area. The device also includes a user interface executable on the device and configured to receive stylus-based user input, the user input comprising at least one of unlocking input that causes the device to transition from a lock mode to an unlock mode and/or locking input that causes the device to transition from an unlock mode to a lock mode. In some cases, at least one of the unlocking and/or locking inputs is associated with rotating and/or depressing a control feature on the stylus. In some cases, the control feature may be rotatable. In some such cases, the unlocking input represents control feature action including rotation in a first direction to a first reference point, rotation in a second direction opposite the first direction to a second reference point, and rotation in the first direction to a third reference point. In some cases, the user interface is configured to determine if the unlocking input is sufficient to transition the device from lock mode to unlock mode. In some cases, the user interface is configured to provide a feedback indicator signal that allows the stylus to indicate that the touch sensitive device is locked, the device is unlocked, the unique unlocking input is being configured, the unique unlocking input has been set, an improper unique unlocking input has been entered, and/or a proper unique unlocking input has been entered. In some cases, the device is a smart phone, eReader, or tablet computer.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to receive (from a stylus-based control feature) an unlocking input that causes a touch sensitive device to transition from a lock mode to an unlock mode, and transition the touch sensitive device from the lock mode to the unlock mode (in response to the unlocking input). In some cases, the process is configured to receive (from a stylus-based control feature) a locking input that causes the touch sensitive device to transition from the unlock mode to the lock mode, and transition the touch sensitive device from the unlock mode to the lock mode (in response to the locking input). In some cases, the process is configured to provide a feedback indicator signal to indicate that the device is locked, the device is unlocked, the input is being configured, the input has been set, an improper input has been entered, and/or a proper input has been entered. In some cases, the stylus-based control feature is rotatable. In some such cases, the unlocking input represents control feature action including rotation in a first direction to a first reference point, and rotation in a second direction opposite the first direction to a second reference point.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A stylus comprising:
   an elongated body portion having a stylus tip located on an end of the elongated body portion and for interacting with an electronic touch sensitive device; and
   a lock/unlock control feature for providing user input to the electronic touch sensitive device via a wireless communication link, the lock/unlock control feature attached to the elongated body, wherein the user input comprises at least one of a locking input that causes the electronic touch sensitive device to transition from an unlock mode to a lock mode and an unlocking input that causes the electronic touch sensitive device to transition from the lock mode to the unlock mode;
   wherein the lock/unlock control feature is a twistable button knob located on an end opposite the stylus tip, the twistable button knob able to be rotated relative to the main axis of the stylus, depressed along the main axis of the stylus, and rotated relative to the main axis of the stylus while being depressed along the main axis of the stylus, and
   wherein the twistable button knob is configured to be rotated, depressed, or rotated and depressed relative to the elongated body portion of the stylus to provide at least one of the locking and the unlocking input.

2. The stylus of claim 1 wherein at least one of the unlocking input and the locking input is user-configurable.

3. The stylus of claim 1 wherein at least one of the unlocking input and the locking input is configurable from the stylus itself.

4. The stylus of claim 1 wherein the unlocking input requires at least one of a unique pattern, sequence, and passkey.

5. The stylus of claim 4 wherein at least one of the body portion and the twistable button knob includes reference points for assisting with entering the unlocking input.

6. The stylus of claim 1 further comprising a feedback indicator for indicating at least one of the following: the electronic touch sensitive device is locked, the electronic touch sensitive device is unlocked, the unlocking input is being configured, the unlocking input has been set, an improper unlocking input has been entered, and a proper unlocking input has been entered.

7. The stylus of claim 6 wherein the feedback indicator includes at least one of a multi-colored light-emitting diode (LED), a speaker, and a motor attached to an eccentric weight.

8. A system comprising the stylus of claim 1 and the electronic touch sensitive device.

9. The system of claim 8 wherein the stylus is configured to determine if the unlocking input is sufficient to transition the electronic touch sensitive device from the lock mode to the unlock mode.

10. A device comprising:
    a touch sensitive area for receiving input from a stylus via at least one of direct and proximate contact between the stylus and touch sensitive area, the stylus including an elongated body portion having a stylus tip located on an end of the elongated body portion; and
    a user interface executable on the device and configured to receive stylus-based user input via a wireless communication link and a stylus lock/unlock control feature attached to the stylus, the user input comprising at least one of an unlocking input that causes the device to transition from a lock mode to an unlock mode and a locking input that causes the device to transition from the unlock mode to the lock mode;
    wherein the stylus lock/unlock control feature is a twistable button knob located on an end opposite the stylus tip, the twistable button knob able to be rotated relative to the main axis of the stylus, depressed along the main axis of the stylus, and rotated relative to the main axis of the stylus while being depressed along the main axis of the stylus, and
    wherein at least one of the unlocking input and the locking input is associated with rotating, depressing, or rotating and depressing the twistable button knob relative to the elongated body portion of the stylus the stylus.

11. The stylus of claim 1 wherein the at least one of the unlocking and locking input is provided by depressing and rotating the twistable button knob.

12. The device of claim 10 wherein the unlocking input represents twistable button knob control feature action including:
    rotation in a first direction to a first reference point;
    rotation in a second direction opposite the first direction to a second reference point; and
    rotation in the first direction to a third reference point.

13. The device of claim 10 wherein the user interface is configured to determine if the unlocking input is sufficient to transition the device from the lock mode to the unlock mode.

14. The device of claim 10 wherein the user interface is configured to provide a feedback indicator signal that allows the stylus to indicate at least one of the following: the device is locked, the device is unlocked, the unlocking input is being configured, the unlocking input has been set, an improper unlocking input has been entered, and a proper unlocking input has been entered.

15. The device of claim 10 wherein the device is a smart phone, eReader, or tablet computer.

16. A non-transitory computer product including a plurality of instructions encoded thereon that when executed by one or more processors cause a process to be carried out, the process comprising:
   receive at a touch sensitive device, via a wireless communication link and from a stylus-based lock/unlock control feature attached to a stylus, an unlocking input that causes the touch sensitive device to transition from a lock mode to an unlock mode, wherein the stylus includes an elongated body portion having a stylus tip located on an end of the elongated body portion; and
   transition the touch sensitive device from the lock mode to the unlock mode, in response to the unlocking input;
   wherein the stylus lock/unlock control feature is a twistable button knob located on an end opposite the stylus tip, the twistable button knob able to be rotated relative to the main axis of the stylus, depressed along the main axis of the stylus, and rotated relative to the main axis of the stylus while being depressed along the main axis of the stylus, and
   wherein the unlocking input is associated with rotating, depressing, or rotating and depressing the twistable button knob relative to the elongated body portion of the stylus.

17. The stylus of claim 10 wherein the unlocking input is associated with depressing and rotating the twistable button knob.

18. The non-transitory computer program product of claim 16, the process further comprising:
   receive at the touch sensitive device, via the wireless communication link and from the twistable button knob, a locking input that causes the touch sensitive device to transition from the unlock mode to the lock mode; and
   transition the touch sensitive device from the unlock mode to the lock mode, in response to the locking input.

19. The non-transitory computer program product of claim 16, the process further comprising:
   provide a feedback indicator signal to indicate at least one of the touch sensitive device is locked, the touch sensitive device is unlocked, the input is being configured, the input has been set, an improper input has been entered, and a proper input has been entered.

20. The non-transitory computer program product of claim 16 wherein the unlocking input includes rotation of the twistable button knob in a first direction to a first reference point, and rotation of the twistable button knob in a second direction opposite the first direction to a second reference point.

* * * * *